United States Patent [19]

Oka et al.

[11] Patent Number: 5,494,722
[45] Date of Patent: Feb. 27, 1996

[54] MAGNETIC RECORDING MEDIUM AND METHOD FOR ITS PRODUCTION

[75] Inventors: Masahiro Oka; Fumiaki Yokoyama, both of Yokohama, Japan

[73] Assignee: Mitsubishi Chemical Corporation, Tokyo, Japan

[21] Appl. No.: 9,002

[22] Filed: Jan. 26, 1993

[30] Foreign Application Priority Data

Jan. 29, 1992 [JP] Japan .................................... 4-013889

[51] Int. Cl.$^6$ .............................. B32B 3/02; B32B 5/16; B32B 15/00; G11B 5/66
[52] U.S. Cl. ................. 428/65.3; 428/65.4; 428/65.6; 428/65.7; 428/610; 428/332; 428/336; 428/704; 428/666; 428/667; 428/678; 428/694 T; 428/694 TS; 428/694 TP; 428/694 SL; 428/694 ST; 428/900; 428/928
[58] Field of Search ................... 428/694 T, 64, 428/694 TS, 694 TP, 900, 928, 695, 610, 694 ST, 694 SL, 332, 336, 704, 666, 667, 678, 65.3, 65.4, 65.6, 65.7; 427/128, 129, 130, 131, 132; 204/192.1, 192.3, 192.2

[56] References Cited

U.S. PATENT DOCUMENTS

| | | | |
|---|---|---|---|
| 5,006,388 | 4/1991 | Kuzuo et al. | 428/64 |
| 5,013,616 | 5/1991 | Morichika et al. | 428/694 |
| 5,024,903 | 6/1991 | Mizukami et al. | 428/694 |

FOREIGN PATENT DOCUMENTS

| | | |
|---|---|---|
| 0391258 | 10/1990 | European Pat. Off. . |
| 57-34324 | 2/1982 | Japan . |
| 59-88806 | 11/1984 | Japan . |
| 63-18607 | 1/1988 | Japan . |
| 5-7830 | 1/1993 | Japan . |

OTHER PUBLICATIONS

35th Spring Meeting of the Japan Society of Applied Physics and Related Societies in 1988, Reference Materials 29–c–10 (w/summary).

Meeting of Technical Group on Component Parts and Materials of the Institute of Electronics, Information and Communication Engineers, Reference Material CPM88–92 (w/summary).

35th Spring Meeting of the Japan Society of Applied Physics and Related Societies in 1988, Reference Materials 29–c–9 (w/summary).

Primary Examiner—Leszek Kiliman
Attorney, Agent, or Firm—Oblon, Spivak, McClelland, Maier & Neustadt

[57] ABSTRACT

A thin-film rigid disk magnetic medium is prepared having a non-magnetic substrate and a magnetic alloy layer formed on the substrate with a non-magnetic underlayer containing chromium as the main component interposed therebetween, where the magnetic alloy layer contains cobalt as the main component and not more than 8 atomic % of boron, not more than 40 atomic % of nickel, not more than 26 atomic % of chromium and not more than 10 atomic % of tantalum. Preferably, the magnetic alloy layer is formed by sputtering while a voltage relatively lower than the plasma potential is applied to the non-magnetic substrate.

19 Claims, 6 Drawing Sheets

MAGNETIC RECORDING MEDIUM AND METHOD FOR ITS PRODUCTION

BACKGROUND OF THE INVENTION

1. Field of the Invention

The present invention relates to a magnetic recording medium and more particularly to a rigid magnetic recording disk having improved magnetic properties, and a method for its production.

2. Discussion of the Background

In recent years, the application range of magnetic recording apparatus, such as magnetic disk drives and flexible disk drives, has been remarkably expanded and their importance has increased. At the same time, with respect to magnetic recording media to be used for such apparatus, remarkable improvements in the recording density are being made.

With respect to such magnetic recording media, it is necessary to increase the recording density further. For this purpose, the coercivity must be increased and the signal to noise ratio (SN ratio) of the magnetic recording layer must be increased.

It is generally known that the following relationships exist between the properties of a magnetic recording medium and the linear recording density, the output and the SN ratio:

(Linear recording density)$\propto$(Hc/Br·t)

(Output)$\propto$(Br·t·Hc)

(SN ratio)$\propto$(Hc/Br·t)

where Hc represents the coercivity, Br represents the residual magnetic flux density, and t represents the thickness of the magnetic layer. Further, the symbol $\propto$ indicates that the property on the left side is proportional to the value on the right side.

Accordingly, in designing a magnetic recording medium having a high recording density, it is necessary to increase the coercivity, while maintaining Br·t without reducing the required output.

In recent years, with a view to attaining the high recording density, thin metal layer-type magnetic recording media have been used instead of coating-type magnetic recording media where the magnetic layer is formed by coating a magnetic coating material comprising a magnetic particle and a binder resin.

In such thin metal layer-type magnetic recording media, the magnetic layer is formed by a method such as electroless plating, electroplating, sputtering or vapor deposition. As the composition for such magnetic layer, a Co(cobalt)-P(phosphorus) alloy, a Co-Ni(nickel)-P alloy, a Co-Ni-Cr(chromium) alloy, a Co-Ni-Pt(platinum) alloy or a Co-Cr-Ta(tantalum) alloy has been practically employed.

Recently, it has been reported that in a layer-forming method by sputtering, a high coercivity is obtainable by applying a negative bias voltage to the substrate during the formation of the magnetic layer (The 35th Spring Meeting the Japan Society of Applied Physics and Related Societies in 1988, Reference Materials 29a-C-9 and -10, and Meeting of Technical Group on Component Parts and Materials of the Institute of Electronics, Information and Communication Engineers, Reference Material CPM88-92, Japanese Unexamined Patent Publication No. 34,324/1982).

It is known that high coercivity is obtainable by adding Pt to a Co-Cr type magnetic layer (Japanese Unexamined Patent Publication No. 88,806/1984) or to a Co-Cr-Ta type magnetic layer (U.S. Pat. No. 5,024,903). However, it is difficult to achieve both high performance and low price, using expensive materials such as platinum as a component of the magnetic layer.

In the meantime, thin-film magnetic recording media having a Co-Ni-B(boron)-transition metal type magnetic layer or a Co-Ni-Cr-B type magnetic layer (Japanese Unexamined Patent Publication No. 18,607/1988, No. 49,021/1991) have been proposed. However, the above-mentioned thin-film magnetic recording media are still insufficient in coercivity.

SUMMARY OF THE INVENTION

Accordingly, one object of the present invention is to provide a thin metal film (referred to below as "thin film") magnetic recording medium having a high SN ratio and improved coercivity.

The present invention provides a thin-film rigid disk magnetic medium comprising a non-magnetic substrate and a magnetic alloy layer formed on the substrate with a non-magnetic underlayer containing chromium as the main component interposed therebetween, wherein the magnetic alloy layer contains cobalt as the main component and not more than 8 atomic % of boron, not more than 40 atomic % of nickel, not more than 26 atomic % of chromium and not more than 10 atomic of tantalum.

The present invention also provides a method for producing a thin-film rigid disk magnetic medium, which comprises sequentially forming on a non-magnetic substrate, a non-magnetic underlayer containing chromium as the main component and a magnetic alloy layer by sputtering, wherein the magnetic alloy layer is formed by sputtering under conditions such that a voltage relatively lower than the plasma potential is applied to the non-magnetic substrate to form a magnetic alloy layer containing cobalt as the main component and not more than 8 atomic % of boron, not more than 40 atomic % of nickel, not more than 26 atomic % of chromium and not more than 10 atomic % of tantalum.

Now, the present invention will be described in detail with reference to the preferred embodiments.

DETAILED DESCRIPTION OF THE PREFERRED EMBODIMENTS

In the present invention, the non-magnetic substrate is not particularly limited. Usually, an aluminum alloy plate provided with a nickel-phosphorus layer formed by electroless plating, is used. However, it is also possible to employ other substrates such as a substrate of a metal such as copper or titanium, a glass substrate, a ceramic substrate, a carbon substrate or a silicon substrate.

However, in cases where the substrate is a non-conductive substrate, it is necessary to adjust the system; for example, alternate current may be adopted for the bias voltage application system for the formation of the magnetic layer, or the apparatus may be adjusted to increase the plasma potential during sputtering while maintaining the substrate at the level of the ground potential.

The non-magnetic underlayer containing chromium as the main component (sometimes referred to below as a "Cr-type underlayer") formed on such a non-conductive substrate, usually has a thickness of at least 100 Å, preferably at least 300 Å. The upper limit of the thickness is not particularly limited. However, the thickness is preferably practically not higher than 3000 Å from the viewpoint of the productivity and the magnetic properties other than the coercivity, such as squareness.

When a magnetic layer is formed by conventional sputtering without applying a negative bias voltage to the substrate, the thickness of the Cr-type underlayer is required to be about 1500 to 3000 Å in order to increase the coercivity of the magnetic layer. Whereas, the thickness of the Cr-type underlayer may be thin so long as it is sufficient for the in-plane orientation of the axis of easy magnetization of the magnetic layer, and even with a thin underlayer, a high coercivity can easily be obtained.

The Cr-type underlayer may be any layer so long as it contains Cr as the main component (at least 50 atomic %). That is, so long as the crystallinity of the Cr is not impaired, it may contain elements other than Cr, such as aluminum, copper, silicon etc., in a few percent.

There is no particular restriction as to the sputtering conditions for forming the Cr-type underlayer. It is possible to employ sputtering conditions which are commonly employed for the formation of a conventional Cr-type underlayer. A negative bias voltage may or may not be applied to the substrate during formation of the Cn-type underlayer. When it is applied, the magnetic properties will be improved to some extent.

In the present invention, the magnetic alloy layer to be formed on such a Cr-type underlayer, is a Co-Cr-Ni-B-Ta type magnetic layer which contains Co as the main component and not more than 8 atomic %, preferably from 0.005 to 8.0 atomic %, more preferably from 1 to 4 atomic % of B. When the content of B exceeds 8 atomic %, no further effect of increasing the coercivity is obtained.

Further, the content of Ni is not more than 40 atomic %, preferably from 10 to 35 atomic %. The coercivity tends to increase as the content of Ni increase. When the Ni content exceeds 40 atomic %, a decrease of the coercivity is observed.

In this invention, the content of Cr is not more than 26 atomic %, preferably from 5 to 26 atomic %, more preferably from 6 to 10 atomic %. When the Cr content exceeds 26 atomic %, the saturation magnetic flux density tends to be small and impractical. On the other hand, when it is less than 6 atomic %, the effect of increasing the coercivity is small.

The content of Ta is not more than 10 atomic %, preferably from 0.005 to 6 atomic %, more preferably from 2 to 5 atomic %. Even if the content of Ta is very small, an increase in the coercivity and in the SN ratio of the provided magnetic recording medium is observed. When the Ta content exceeds 5 atomic %, the coercivity begins to saturate, and when it exceeds 10 atomic %, the saturation magnetic flux density tends to be small and impractical. Accordingly, the content of Ta is as small as possible, yet within a range which is capable of providing the necessary effect.

In the present invention, the magnetic alloy layer preferably has a segregation structure wherein low chromium concentration regions are surrounded by high chromium concentration regions. In the segregation structure, the diameters of the surrounded low chromium concentration regions are within a range of from 10 to 500 Å, and the number of the surrounded low chromium concentration regions is from 600 to 100,000 regions/$\mu m^2$.

The thickness of the magnetic layer may suitably be determined depending upon the properties required for the magnetic recording medium. Usually, it is from 200 to 1500 Å, preferably from 200 to 800 Å.

Further, when sputtering for the formation of the magnetic layer is conducted in an argon atmosphere, argon is unavoidably included in the magnetic layer by the bias effects which will be described below. The amount of argon is at a level of from about 0.2 to 1.5 atomic %, which is larger than a sputtering layer-forming process in which a bias voltage is not applied.

The magnetic recording medium of the present invention is easily produced by sputtering a Cr-type underlayer and a Co-Cr-Ni-B-Ta type magnetic layer onto a non-magnetic substrate. The sputtering method may be a direct current magnetron sputtering method or a radio frequency magnetron sputtering method. When the substrate is a non-conductive substrate, a radio frequency magnetron sputtering method is preferably employed.

The method for producing a magnetic recording medium of the present invention is characterized in that the above-mentioned Co-Cr-Ni-B-Ta type alloy magnetic layer is formed by sputtering under conditions such that a negative bias voltage is applied to the non-magnetic substrate, i.e., in such a state that a voltage relatively lower than the plasma potential is applied to the non-magnetic substrate.

In the present invention, the coercivity of the magnetic recording medium obtained, is remarkably influenced by the negative bias voltage applied to the substrate during the formation of the magnetic layer by sputtering. As to the radio frequency magnetron sputtering method, the coercivity is remarkably improved, when the negative substrate bias voltage exceeds –40 V. However, when the negative substrate bias voltage applied to the non-magnetic substrate is too large, the formed magnetic layer is subjected to re-sputtering, and the magnetic properties tend to be poor.

Accordingly, when the above-mentioned substrate bias method is used with a radio frequency magnetron sputtering method, the negative substrate bias voltage is preferably within a range of from about –40 to –250 V for forming the above-mentioned Co-Cr-Ni-B-Ta type alloy magnetic layer, and when employed to a direct current magnetron sputtering method, the negative substrate bias voltage is preferably within a range of from about –40 to –500 V.

To apply a voltage relatively lower than the plasma potential to the non-magnetic substrate, it is possible to employ a method wherein a negative voltage is applied to the non-magnetic substrate relative to the grounded portion of the main body of the sputtering apparatus (hereinafter referred to also as the substrate bias method), or a method wherein the plasma potential is adjusted to be higher than the ground potential while maintaining the non-magnetic substrate at the level of the ground potential.

In the method where the plasma potential is set at a level higher than the ground potential while maintaining the non-magnetic substrate at the level of the ground potential, it is preferable that an intermediate electrode be provided in the vicinity of the target, and a positive voltage of, e.g. not higher than 1000 V, preferably from 50 to 500 V, be applied to the intermediate electrode relative to the grounded portions of the non-magnetic substrate and the main body of the sputtering apparatus.

The effects of the application of the plasma potential and the bias potential during the layer-forming operation by sputtering, are affected by geometrical factors such as the dimension and the shape of the sputtering apparatus. Therefore, the above-mentioned values of the negative substrate bias voltage and the value of the positive voltage applied to the intermediate electrode, are not absolute values, and the optimum ranges thereof vary depending upon the particular apparatus.

The coercivity of the magnetic recording medium obtained, is remarkably influenced by the temperature of the non-magnetic substrate during the sputtering operation. A remarkable increase of the coercivity is observed when the substrate temperature is at least 150° C., and it is possible to obtain a high coercivity exceeding 1000 Oe. Accordingly, the substrate temperature during the layer-forming operation, is preferably at least 150° C. The upper limit for the substrate temperature during the layer-forming operation, cannot be simply defined. However, for example, in the case of an aluminum alloy substrate provided with a nickel-phosphorus plating by electroless plating, the substrate temperature is usually preferably at most 300° C. to maintain the surface smoothness and to prevent the magnetization of the nickel-phosphorus plating.

The pressure during the sputtering operation is preferably as low as possible, since the mean free path for atoms or ions thereby increases. However, under high vacuum conditions exceeding $1\times10^{-3}$ mTorr, it is difficult to maintain a stabilized plasma state in conventional sputtering apparatus. Therefore, the practical pressure range is preferably from $1\times10^{-3}$ to $20\times10^{-3}$ mTorr.

In the magnetic recording medium of the present invention, an overcoat layer such as carbon and/or a lubricant layer composed of a suitable lubricant may further be formed on the magnetic layer, as required.

Now, the present invention will be described in further detail with reference to Examples and Comparative Examples. However, it should be understood that the present invention is by no means restricted by such specific Examples.

EXAMPLES

EXAMPLES 1 to 4

A non-magnetic Ni-P layer was formed by electroless plating to a thickness of 25 μm on the surface of an aluminum alloy disk substrate having an inner diameter of 25 mm and an outer diameter of 95 mm, and the surface was polished for specular finish to obtain an Ra (central line average roughness) of from 20 to 30 Å. This non-magnetic substrate was mounted in a radio frequency (13.56 MHz) magnetron sputtering apparatus, and the apparatus was evacuated to $1\times10^{-6}$ Torr. The substrate temperature was then raised to 250° C., and a Cr underlayer was formed to a thickness of about 1000 Å at $5\times10^{-3}$ Torr partial pressure of Ar, while applying a direct current bias voltage of −100 V to the substrate.

By using targets having a few number of Ta chips mounted on targets having a composition of Co 59.5 atomic %—Cr 7.5 atomic %—Ni 30 atomic %—B 3 atomic %, sputtering was then conducted while applying a direct current bias voltage of −100 V to form various magnetic layers in such a thickness as to bring the residual magnetization (Br.t) of each magnetic layer to the range of from 200 to 600 gauss.μm, to obtain magnetic recording media. The composition of the magnetic layers is shown in Table 1(A).

COMPARATIVE EXAMPLES 1 to 4

The magnetic layers were formed in the same manner as in Examples 1 to 4 except that all the Ta chips mounted on the targets were removed and only the targets having a composition used in Examples 1 to 4 were used. The composition of the magnetic layers is shown in Table 1(B).

COMPARATIVE EXAMPLE 5

The magnetic layer was formed in the same manner as in Comparative Examples 1 to 4 except that a target having a composition of Co 65 atomic %—Ni 30 atomic %—B 3 atomic %—Ta 2 atomic % was used.

Figure 1:
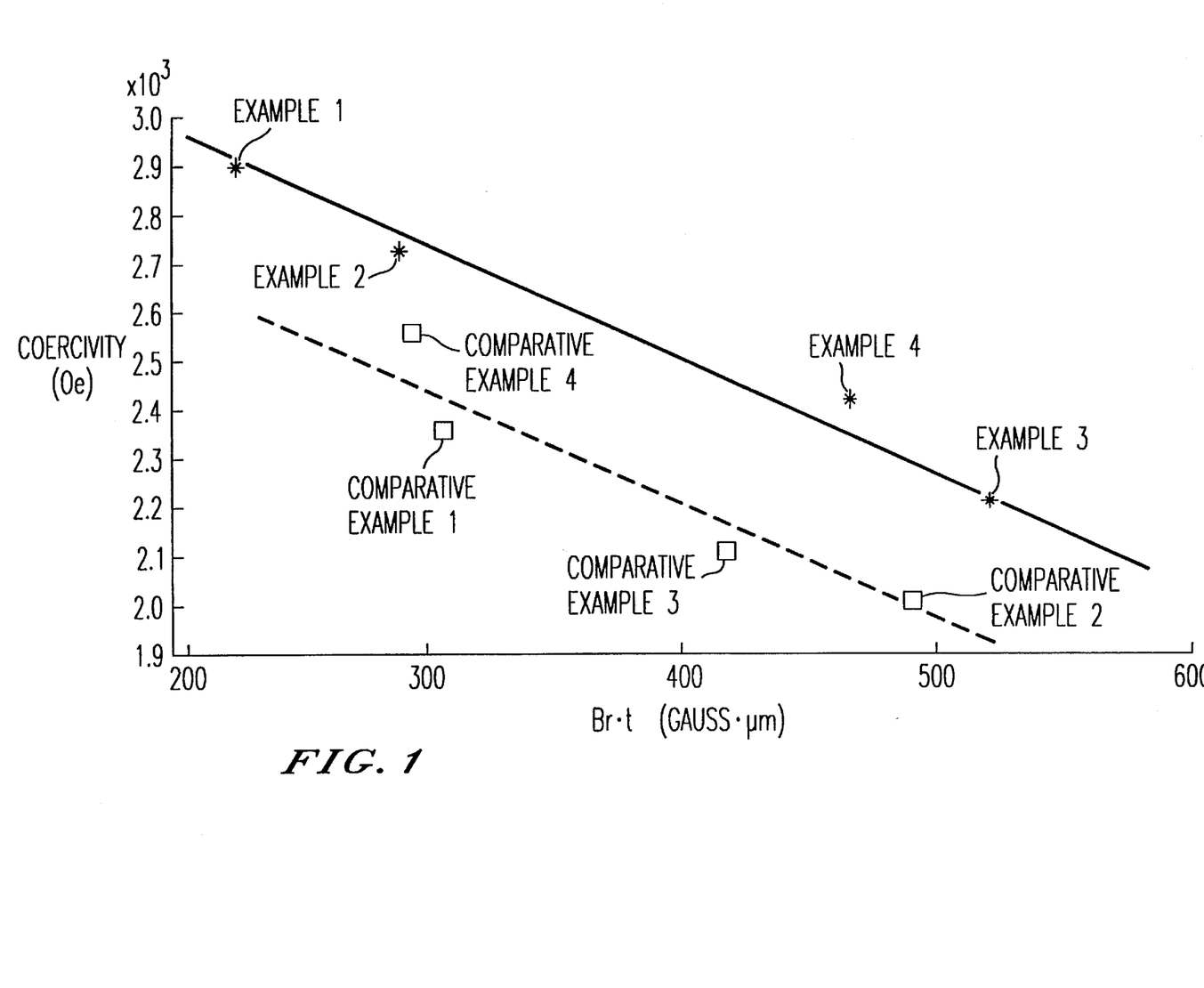
FIG. 1 is a graph showing the relation between residual magnetization and the coercivity, obtained from Examples 1 to 4 and Comparative Examples 1 to 4.

The coercivities of the magnetic recording media thus obtained were measured, and the results are shown as the function of the residual magnetization in FIG. 1 and the coercivity of each magnetic recording medium are shown in Table 2.

The measurement of the coercivities was conducted by means of a sample vibrating type magnetometer, and the analysis of the composition of the magnetic layers was conducted by chemical analysis.

From Table 2 and FIG. 1, it can be seen that the coercivity is increased by addition of Ta and Cr.

TABLE 1

| | magnetic layer composition (atomic %) | | | | |
|---|---|---|---|---|---|
| No. | Co | Ni | Cr | B | Ta |
| A | 60 | 27 | 7.1 | 2.3 | 4.2 |
| B | 62 | 30 | 6.9 | 1.2 | — |

TABLE 2

| | magnetic layer | Br · t (gauss · μm) | Hc (Oe) |
|---|---|---|---|
| EXAMPLE | | | |
| 1 | Co | 218 | 2900 |
| 2 | \| | 283 | 2725 |
| 3 | Ni | 518 | 2200 |
| 4 | \| | 463 | 2413 |
| | Cr | | |
| | \| | | |
| | B | | |
| | \| | | |
| | Ta | | |

TABLE 2-continued

| | magnetic layer | Br · t (gauss · μm) | Hc (Oe) |
|---|---|---|---|
| COMPARATIVE EXAMPLE | | | |
| 1 | Co<br>\|<br>Ni<br>\|<br>Cr<br>\|<br>B | 302 | 2350 |
| 2 | | 488 | 2000 |
| 3 | | 415 | 2100 |
| 4 | | 289 | 2550 |
| 5 | Co<br>\|<br>Ni<br>\|<br>B<br>\|<br>Ta | 232 | 1013 |

TABLE 3-continued

| inductance | 5.2 μH |
|---|---|
| truck width | 9.2 μm |

TABLE 4

| disk rotation | 3600 rpm |
|---|---|
| test radius | 23.8 mm |
| write frequency | 6.0 MHz |

TABLE 5

| | magnetic layer | output (mV) | medium noise (μV) | SN ratio (dB) | D50 (KFRPI) |
|---|---|---|---|---|---|
| EXAMPLE | | | | | |
| 5 | Co<br>\|<br>Ni<br>\|<br>Cr<br>\|<br>B<br>\|<br>Ta | 0.44 | 2.96 | 41.9 | 53.2 |
| 6 | | 0.61 | 4.84 | 39.8 | 52.7 |
| 7 | | 0.75 | 6.15 | 39.6 | 50.1 |
| 8 | | 0.88 | 7.87 | 38.9 | 49.5 |
| 9 | | 0.57 | 3.91 | 41.3 | 52.4 |
| 10 | | 0.76 | 5.72 | 40.3 | 48.1 |
| COMPARATIVE EXAMPLE | | | | | |
| 6 | Co<br>\|<br>Ni<br>\|<br>Cr<br>\|<br>B | 0.48 | 4.42 | 38.0 | 47.6 |
| 7 | | 0.55 | 4.81 | 39.0 | 48.1 |
| 8 | | 0.70 | 7.07 | 36.8 | — |
| 9 | | 0.76 | 8.22 | 36.0 | 41.6 |

EXAMPLES 5 to 10 and COMPARATIVE EXAMPLES 6 to 9

Magnetic alloy layers having composition A and B were formed in the same manner as in Examples 1 to 4 and Comparative Examples 1 to 4. Then, a carbon overcoat layer with a thickness of 280 Å was formed on each magnetic alloy layer by sputtering and a fluorine-containing lubricant with a thickness of 20 Å was coated on the carbon overcoat layer. The recording performance of each magnetic recording disk was measured and the results are shown in Table 5.

The measurement was carried out by using a double metal-in-gap head for hard disk use. The specifications of the head are shown in Table 3, and the conditions of the measurement are shown in Table 4.

TABLE 3

| coil turn | 20 T |
|---|---|
| fly height | 0.1 μm |
| gap length | 0.43 μm |
| gap depth | 3 μm |

Figure 2:
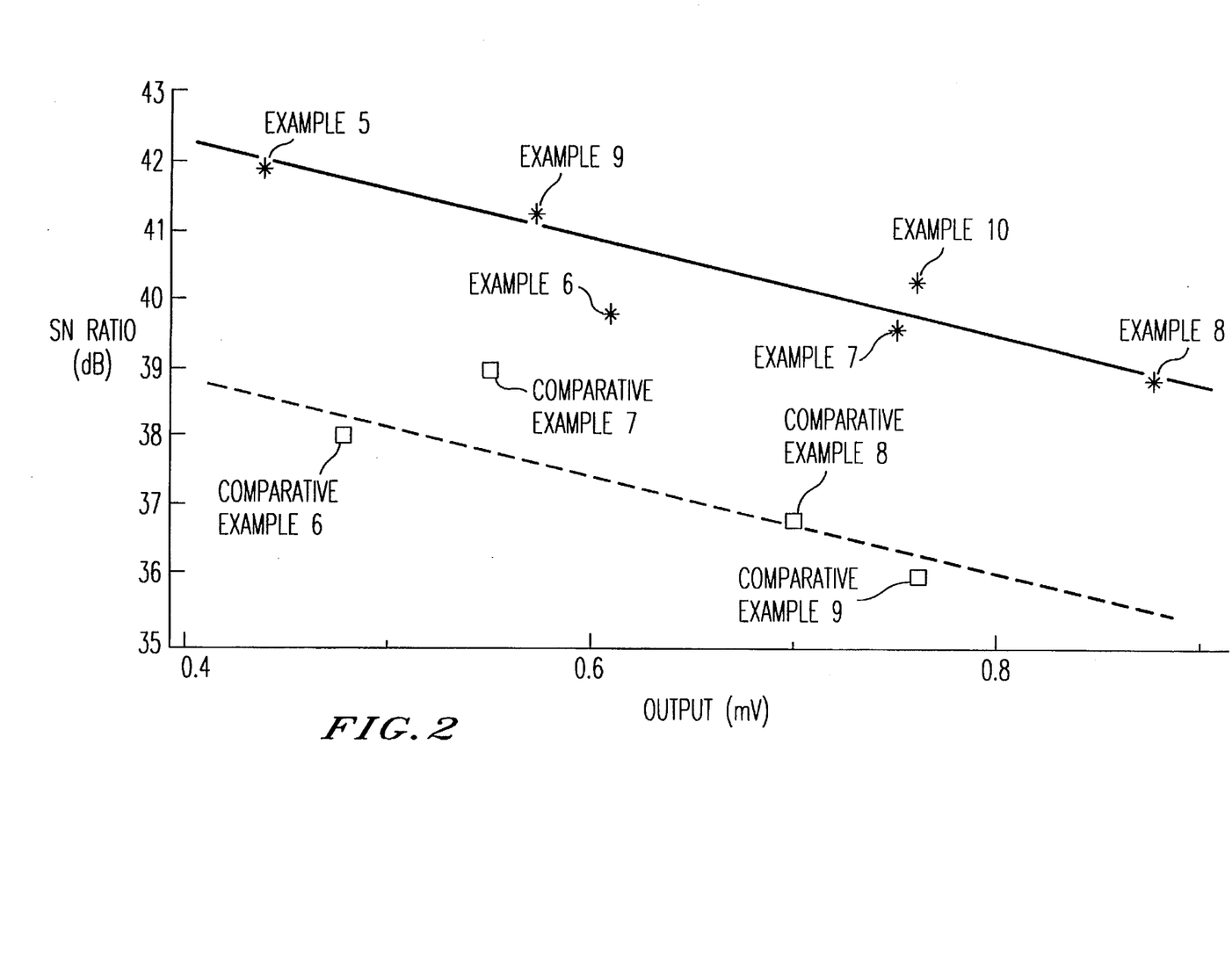
FIG. 2 is a graph showing the relation between the output and the SN ratio obtained from Examples 5 to 10 and Comparative Examples 6 to 9.
Figure 3:
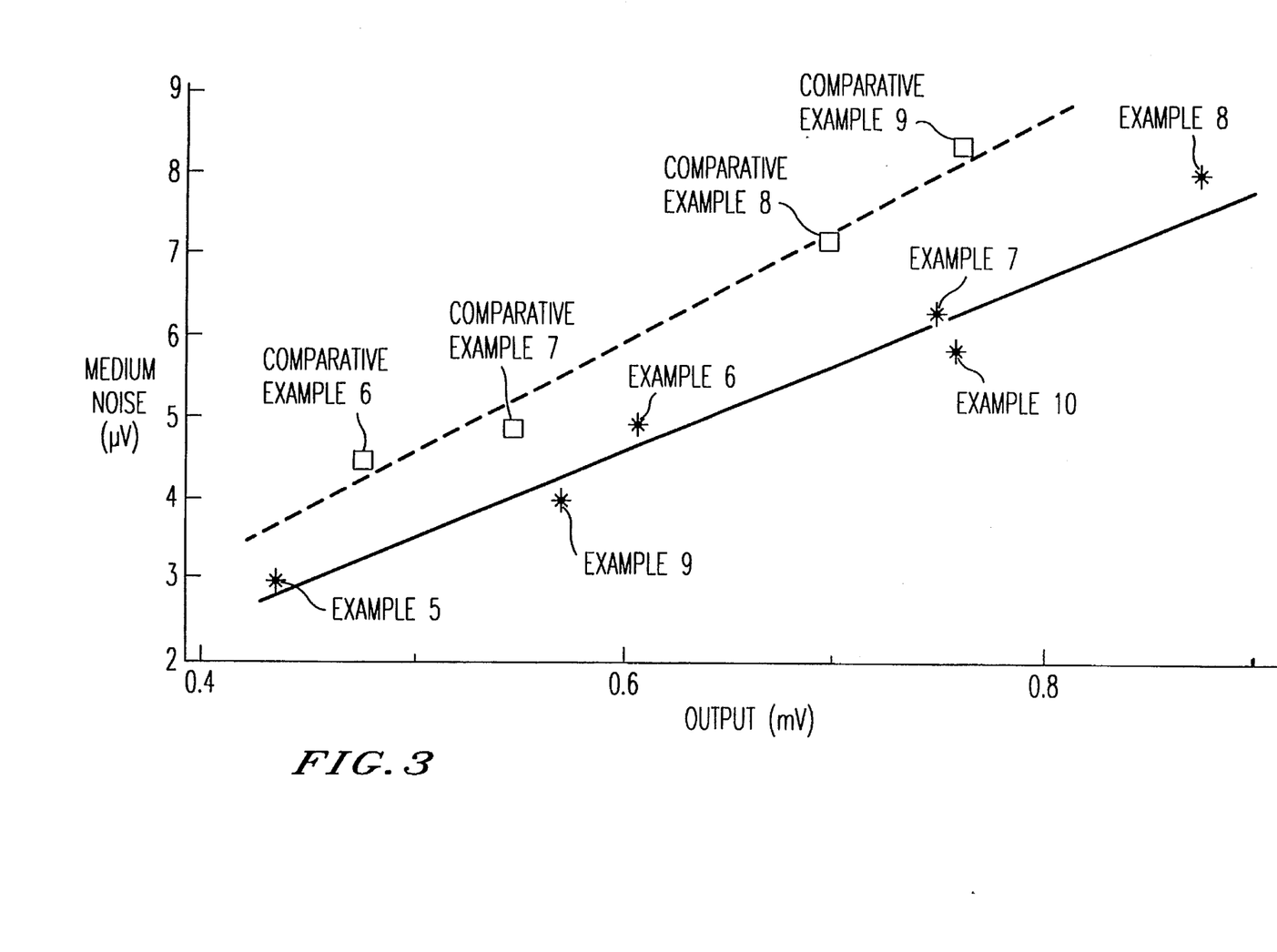
FIG. 3 is a graph showing the relation between the output and the medium noise obtained from Examples 5 to 10 and Comparative Examples 6 to 9.
Figure 4:
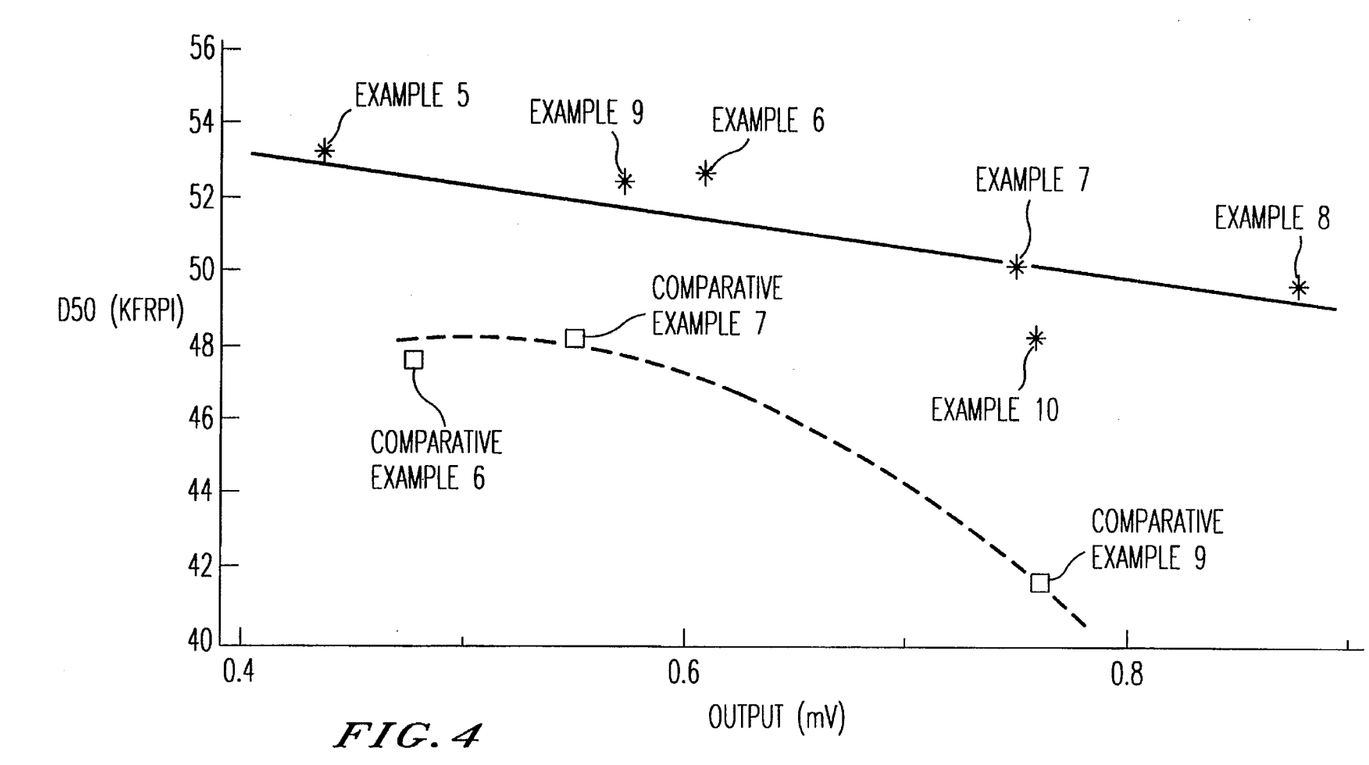
FIG. 4 is a graph showing the relation between the output and the D50(-6dB roll-off density) obtained from Examples 5 to 10 and Comparative Examples 6, 7 and 9.

The relationship between the output and the SN ratio is shown in FIG. 2, the relationship between the medium noise and the output is shown in FIG. 3, and the relationship between the output and −6 dB roll-off density (D50) is shown in FIG. 4.

From FIG. 2, it is evident that the magnetic recording medium containing Ta in the magnetic alloy layer is superior in SN properties.

From FIG. 3, it is evident that by addition of Ta to the magnetic alloy layer, the medium noise is remarkably reduced.

From FIG. 4, it is also seen that the magnetic recording medium containing Ta in the magnetic alloy layer is superior in D50.

EXAMPLES 11 to 14 and COMPARATIVE EXAMPLES 10 to 13

Figure 5:
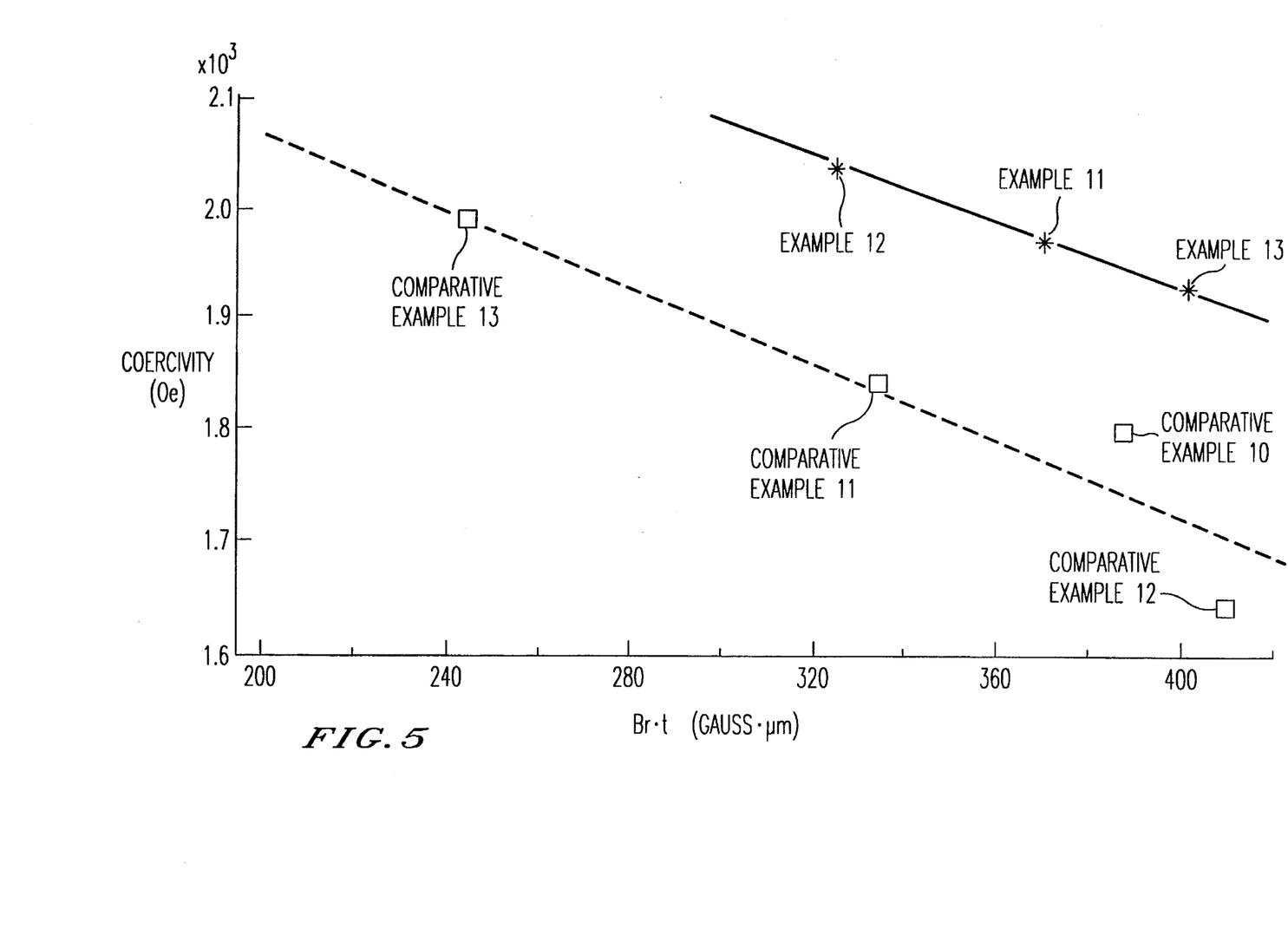
FIG. 5 is a graph showing the relation between residual magnetization and the coercivity obtained from Examples 11 to 13 and Comparative Examples 10 to 13.

Magnetic alloy layers having composition A and B were formed in the same manner as in Examples 5 to 10 and Comparative Examples 6 to 9, except that a direct current magnetron sputtering apparatus was used and a substrate bias voltage of −200 V was used. The properties of the magnetic recording media were measured, and the results are shown in Table 6, FIG. 5 and FIG. 6.

Figure 6:
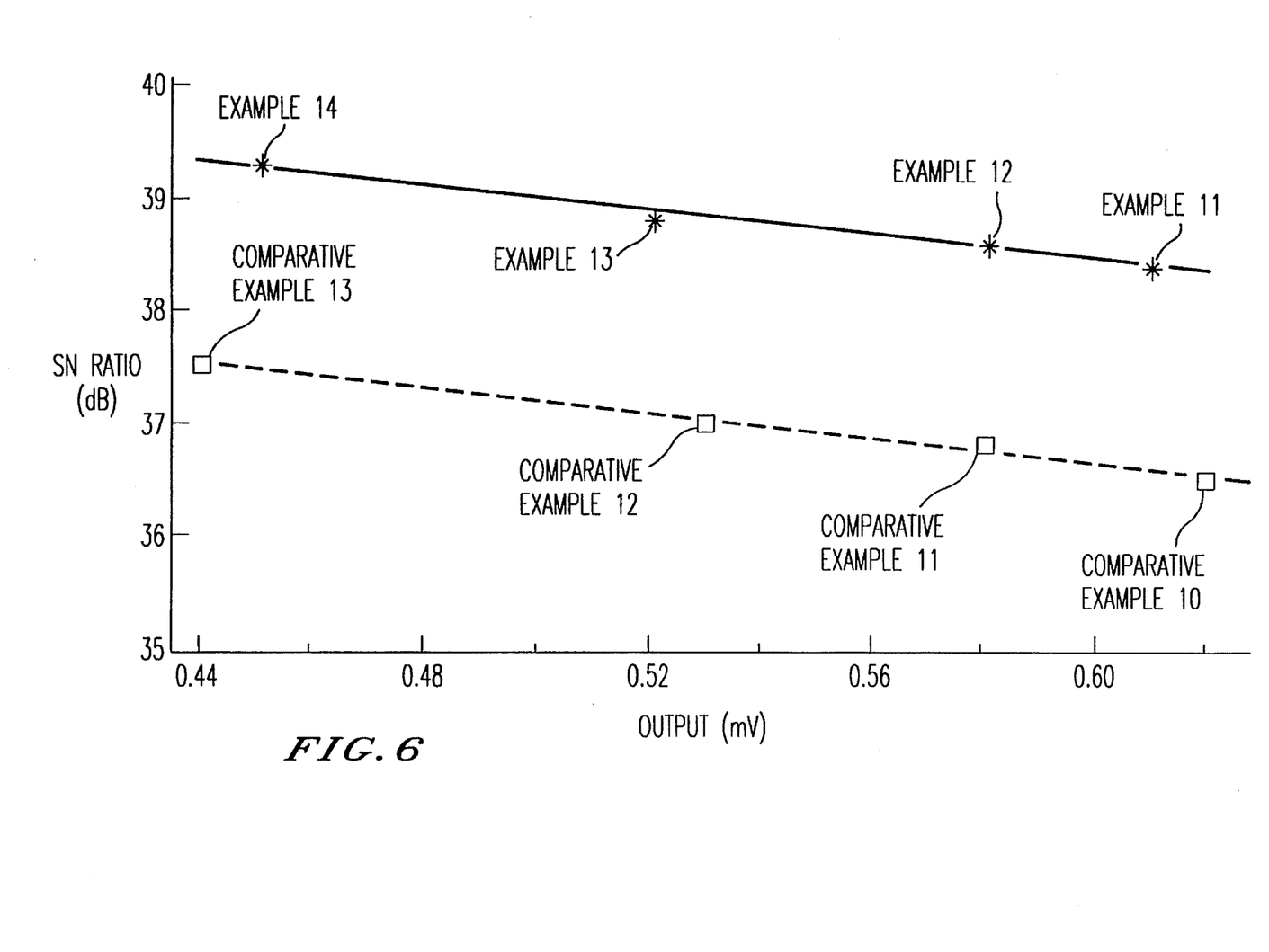
FIG. 6 is a graph showing the relation between the output and the SN ratio obtained from Examples 11 to 14 and Comparative Examples 10 to 13.

When a direct current magnetron sputtering method was employed, adding Ta to the magnetic alloy layer increased coercivity (FIG. 5) and improved the SN ratio (FIG. 6).

TABLE 6

|  | magnetic layer | Br · t (gauss · μm) | Hc (Oe) | output (mV) | SN ratio (dB) |
|---|---|---|---|---|---|
| EXAMPLE |  |  |  |  |  |
| 11 | Co | 370 | 1965 | 0.61 | 38.4 |
| 12 | \| | 324 | 2035 | 0.58 | 38.6 |
| 13 | Ni | 401 | 1922 | 0.52 | 38.8 |
| 14 | \| | 212 | 2236 | 0.45 | 39.3 |
|  | Cr |  |  |  |  |
|  | \| |  |  |  |  |
|  | B |  |  |  |  |
|  | \| |  |  |  |  |
|  | Ta |  |  |  |  |
| COMPARATIVE EXAMPLE |  |  |  |  |  |
| 10 | Co | 387 | 1792 | 0.62 | 36.5 |
| 11 | \| | 334 | 1836 | 0.58 | 36.8 |
| 12 | Ni | 410 | 1637 | 0.53 | 37.0 |
| 13 | \| | 244 | 1991 | 0.44 | 37.5 |
|  | Cr |  |  |  |  |
|  | \| |  |  |  |  |
|  | B |  |  |  |  |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A metal thin film rigid disk magnetic medium, comprising:
   a non-magnetic disk shaped substrate;
   a Co-Cr-Ni-B-Ta magnetic alloy layer formed on said substrate;
   a non-magnetic underlayer containing chromium as the main component interposed therebetween; and
   wherein said magnetic alloy layer consists essentially of cobalt as the main component and not more than 8 atomic % of boron, not more than 40 atomic % of nickel, not more than 26 atomic % of chromium and not more than 10 atomic % of tantalum.

2. The magnetic medium of claim 1, wherein said non-magnetic substrate is an aluminum alloy plate provided with a nickel-phosphorus layer.

3. The magnetic medium of claim 1, wherein said non-magnetic substrate is selected from the group consisting of a metal substrate, a glass substrate, a ceramic substrate, a carbon substrate and a silicon substrate.

4. The magnetic medium of claim 1, wherein said non-magnetic underlayer containing chromium as the main component is formed by sputtering while a negative bias voltage is applied to said nonmagnetic substrate.

5. The magnetic medium of claim 1, wherein said magnetic alloy layer contains from 0.005 to 8 atomic % of boron.

6. The magnetic medium of claim 5, wherein said magnetic alloy layer contains from 1 to 4 atomic % of boron.

7. The magnetic medium of claim 1, wherein said magnetic alloy layer contains from 10 to 35 atomic % of nickel.

8. The magnetic medium of claim 1, wherein said magnetic alloy layer contains from 5 to 26 atomic % of chromium.

9. The magnetic medium of claim 8, wherein said magnetic alloy layer contains from 6 to 10 atomic % of chromium.

10. The magnetic medium of claim 1, wherein said magnetic alloy layer contains from 0.005 to 6 atomic % of tantalum.

11. The magnetic medium of claim 10, wherein said magnetic layer contains from 2 to 5 atomic % of tantalum.

12. The magnetic medium of claim 1, wherein said magnetic alloy layer contains Co-Cr-Ni-B-Ta regions with a lower chromium concentration than surrounding Co-Cr-Ni-B-Ta regions.

13. The magnetic medium of claim 1, wherein the thickness of said magnetic alloy layer is within a range of from 200 to 800 Å.

14. The magnetic medium of claim 1, further comprising an overcoat layer on said magnetic alloy layer.

15. The magnetic medium of claim 1, wherein said magnetic alloy layer consists of cobalt, boron, nickel, chromium and tantalum.

16. The magnetic medium of claim 12, wherein the diameters of Co-Cr-Ni-B-Ta regions with a lower chromium concentration are within a range of from 10 to 500 Å.

17. The magnetic medium of claim 12, wherein the number of Co-Cr-Ni-B-Ta regions with a lower chromium concentration is from 600 to 100,000 regions/$\mu m^2$.

18. The magnetic medium of claim 14, further comprising a lubricant layer on said overcoat layer.

19. The magnetic medium of claim 15, wherein said magnetic medium exhibits a coercivity of at least 2,035 Oe.

* * * * *